United States Patent
Sölver

(10) Patent No.: US 8,265,049 B2
(45) Date of Patent: Sep. 11, 2012

(54) METHOD AND APPARATUS FOR IMPLEMENTING GENERIC ACCESS NETWORK FUNCTIONALITY IN A WIRELESS COMMUNICATION DEVICE

(75) Inventor: Henrik Sölver, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 777 days.

(21) Appl. No.: 12/345,964

(22) Filed: Dec. 30, 2008

(65) Prior Publication Data

US 2010/0118845 A1    May 13, 2010

Related U.S. Application Data

(60) Provisional application No. 61/113,052, filed on Nov. 10, 2008.

(51) Int. Cl.
*H04W 4/00* (2009.01)
*H04L 12/28* (2006.01)
*H04L 12/56* (2006.01)
*H04L 12/66* (2006.01)

(52) U.S. Cl. ........ 370/338; 370/328; 370/329; 370/352; 370/353; 370/354; 370/355; 370/356; 370/401

(58) Field of Classification Search .................. None
See application file for complete search history.

(56) References Cited

U.S. PATENT DOCUMENTS

| | | | |
|---|---|---|---|
| 6,944,706 B2 * | 9/2005 | Schain et al. | 710/312 |
| 7,843,900 B2 * | 11/2010 | Gallagher et al. | 370/352 |
| 2005/0013280 A1 | 1/2005 | Buddhikot et al. | |
| 2005/0265279 A1 * | 12/2005 | Markovic et al. | 370/328 |
| 2007/0177585 A1 | 8/2007 | El Mghazli et al. | |
| 2007/0265003 A1 * | 11/2007 | Kezys et al. | 455/435.1 |
| 2008/0130564 A1 | 6/2008 | Gallagher et al. | |
| 2009/0059848 A1 * | 3/2009 | Khetawat et al. | 370/328 |
| 2009/0215429 A1 * | 8/2009 | Caldwell et al. | 455/406 |

FOREIGN PATENT DOCUMENTS

WO    2004/062137 A1    7/2004

(Continued)

OTHER PUBLICATIONS

Shaw, "UMA Demystified: Inside UMA-Enabled Dual-Mode Handsets," Mobile Handset Design Line Design Center, Jan. 21, 2008, pp. 1-5, http://www.mobilehandsetdesignline.com/howto/205906491.

(Continued)

*Primary Examiner* — Faruk Hamza
*Assistant Examiner* — Diane Lo
(74) *Attorney, Agent, or Firm* — Coats & Bennett, P.L.L.C.

(57) ABSTRACT

According to one aspect of the teachings presented herein, a "smart" phone or other wireless communication device includes a "modem" processor configured to support cellular communication network signaling and an "applications" processor configured to host call control and/or user applications, such as by providing a desired Operating System (OS) for hosting such applications. In at least one embodiment of a wireless communication device contemplated herein, the modem processor implements a cellular network signaling controller, a Generic Access Network (GAN) manager, and a privately routable, first Internet Protocol (IP) stack. Further, the applications processor implements a publicly routable, second IP stack that implements routing, e.g., a Network Address Translation (NAT) routing, for routing GAN traffic to and from the first IP stack on a local IP link bridging the first and second IP stacks.

17 Claims, 4 Drawing Sheets

FOREIGN PATENT DOCUMENTS

| WO | 2005/008996 A1 | 1/2005 |
| WO | 2007/094861 A2 | 8/2007 |
| WO | 2008/039744 A2 | 4/2008 |
| WO | 2008/097140 A1 | 8/2008 |

OTHER PUBLICATIONS

Fleischer, P. et al. "Formal Specification and Validation of Secure Connection Establishment in a Generic Access Network Scenario." Proceedings of the 29th International Conference on Applications and Theory of Petri Nets. Xi'an, China, 2008, pp. 171-190. ISBN: 978-3-540-68745-0.

Phifer, L. "Slipping IPsec Past NAT." ISP Planet Internet Article, Apr. 19, 2001. Available at: http://www.isp-planet.com/technology/2001/ipsec_nat.html.

Incode Advisors. "UMA's Role within Mobile Network Evolution." Jan. 2006, White Paper.

Yanowitz, J. "Under the Hood of the Internet: An Overview of the TCP/IP Protocol Suite." Internet article from Crossroads The SCM Student Magazine. Publication date unknown. Available at: http://www.acm.org/crossroads/xrds1-1/tcpjmy.html.

Ericsson. "IPv6 in 3G Wireless Networks." Feb. 2001, White Paper.

3RD Generation Partnership Project. 3GPP TS 43.318 V8.3.0 (Aug. 2008). "3rd Generation Partnership Project; Technical Specification Group GSM/EDGE Radio Access Network; Generic Access Network (GAN); State 2 (Release 8)." Aug. 2008.

3RD Generation Partnership Project. 3GPP TS 44.318 V8.3.0 (208-09). "3rd Generation Partnership Project; Technical Specification Group GSM/EDGE Radio Access Network Generic Access Network (GAN); Mobile GAN Interface Layer 3 Specification (Release 8)." Sep. 2008.

Newport Networks. "IPsec in VoIP Networks." 2008, White Paper available at: http://www.newport-networks.com/cust-docs/91-IPSec-and-VoIP.pdf.

Mani, M. et al. "Adopting IMS in WiFi Technology." Proceedings of the 4th International Conference on Mobile Technology, Applications and Systems and the 1st International Symposium on Computer Human Interaction in Mobile Technology. Singapore, 2007, pp. 325-331. ISBN: 978-1-59593-819-0.

Wiljakka, J. "Analysis of IPv6 Transition in 3GPP Networks." IETF Internet Draft, Oct. 2004.

Phifer, L "IP Security and NAT: Oil and Water?" ISP Planet Internet Article, Jun. 15, 2000. Available at: http://www.isp-planet.com/technology/nat_ipsec.html.

* cited by examiner

METHOD AND APPARATUS FOR IMPLEMENTING GENERIC ACCESS NETWORK FUNCTIONALITY IN A WIRELESS COMMUNICATION DEVICE

RELATED APPLICATIONS

This application claims priority under 35 U.S.C. §119(e) from the U.S. Provisional Patent Application Ser. No. 61/113,052, which was filed on 10 Nov. 2008 and entitled "GAN-Bridge."

TECHNICAL FIELD

The present invention generally relates to wireless communication systems and devices, and particularly relates to the implementation of Generic Access Network (GAN) functionality in a wireless communication device.

BACKGROUND

Generic access network (GAN) protocols and operations allow a properly configured wireless communication device to maintain voice call continuity (VCC) as it moves between cellular coverage and local, unlicensed wireless coverage. With GAN capability, users can place voice (and data) calls using a cellular communication network and have call traffic shifted to the potentially cheaper and faster service offered by a Wireless LAN (WLAN) or essentially any other network, system, or access point that offers an Internet Protocol (IP) bearer. For example, a mobile operator providing cellular communication services via a GSM/GPRS network can extend coverage to WLANs or other IP-based networks by coupling them to the GSM/GPRS core network through an appropriately configured network controller.

In the context of GSM/GPRS, GAN protocols and operations are specified by the Third Generation Partnership Project (3GPP) Technical Specifications 43.318 and 44.318. The addition of GAN technology to existing GSM/GPRS networks enables users to roam seamlessly between the wide area GSM/GPRS network and local area networks having IP connectivity to the GSM/GPRS network. WiFi (802.11 b/g/n) radio transceivers are thus commonly included in GAN-enabled cellular handsets.

When a local network is detected by such a handset, it establishes a secure IP connection through a gateway to a server called a GAN Controller (GANC) that is owned or otherwise associated with the mobile operator. The GANC communicatively couples to the GSM/GPRS core network of the mobile operator and makes the signaling coming from the handset look like it is coming from another base station in the GSM/GPRS network. The GANC thus appears to be just another base station from the core network's perspective, although mobility management obviously is different, as the GANC can provide support for devices in any number of geographically separated wireless hotspots.

With the above in mind, GAN technology may be understood as replacing the radio connection between a cellular terminal and a supporting cellular network with an IP connection provided through a local access network. Supporting such operation, GAN functionality broadly divides into three tightly connected main parts: the (cellular) network signaling for access, authentication, and call processing; IP connection control signaling for establishing and carrying out IP-based communications; and, at least for Voice-over-IP (VoIP) calls, audio system processing for handling audio data stream coding/decoding and executing associated audio algorithms.

SUMMARY

According to one aspect of the teachings presented herein, a "smart" phone or other wireless communication device includes a "modem" processor configured to support cellular communication network signaling and an "applications" processor configured to host call control and/or user applications, such as by providing a desired Operating System (OS) for hosting such applications. In at least one embodiment of a wireless communication device contemplated herein, the modem processor implements a cellular network signaling controller, a Generic Access Network (GAN) manager, and a privately routable, first Internet Protocol (IP) stack, which implements IP security (IPsec) in one or more embodiments. Further, the applications processor implements a publicly routable, second IP stack that implements a router for routing GAN traffic to and from the first IP stack on a local IP link bridging the first and second IP stacks. In at least one such embodiment, the second IP stack implements Network Address Translation (NAT) routing, for routing GAN traffic to and from the first IP stack.

In another embodiment, a method of supporting Generic Access Network (GAN) functionality in a wireless communication device comprises operating a privately routable, first IP stack in association with a GAN manager, and operating a publicly routable, second IP stack as a router for the first IP stack. Here, the second IP stack routes outgoing GAN traffic from the first IP stack to a public network interface and routes incoming GAN traffic from the public network interface to the first IP stack, where the first and second IP stacks are bridged via a local IP link.

Among the several advantages provided by the above method and apparatus are decreased GAN implementation complexities as compared to implementing GAN functionality in the applications processor with a proxy-based interface to network signaling controls in the modem processor. GAN implementation complexity is further reduced as substantially the same GAN implementing software can be used for the modem processor, irrespective of the OS hosted on the applications processor. As a further advantage, the above implementation provides increased security as compared to implementation of GAN functionality within the applications processor, because GAN traffic encryption and decryption occurs within the modem processor, where cellular network signaling is hosted, and where Internet Key Exchange (IKE) and IPsec processing is hosted.

Of course, the present invention is not limited to the above summary of features and advantages. Indeed, those skilled in the art will recognize additional features and advantages upon reading the following detailed description, and upon viewing the accompanying drawings.

DETAILED DESCRIPTION

Figure 1:
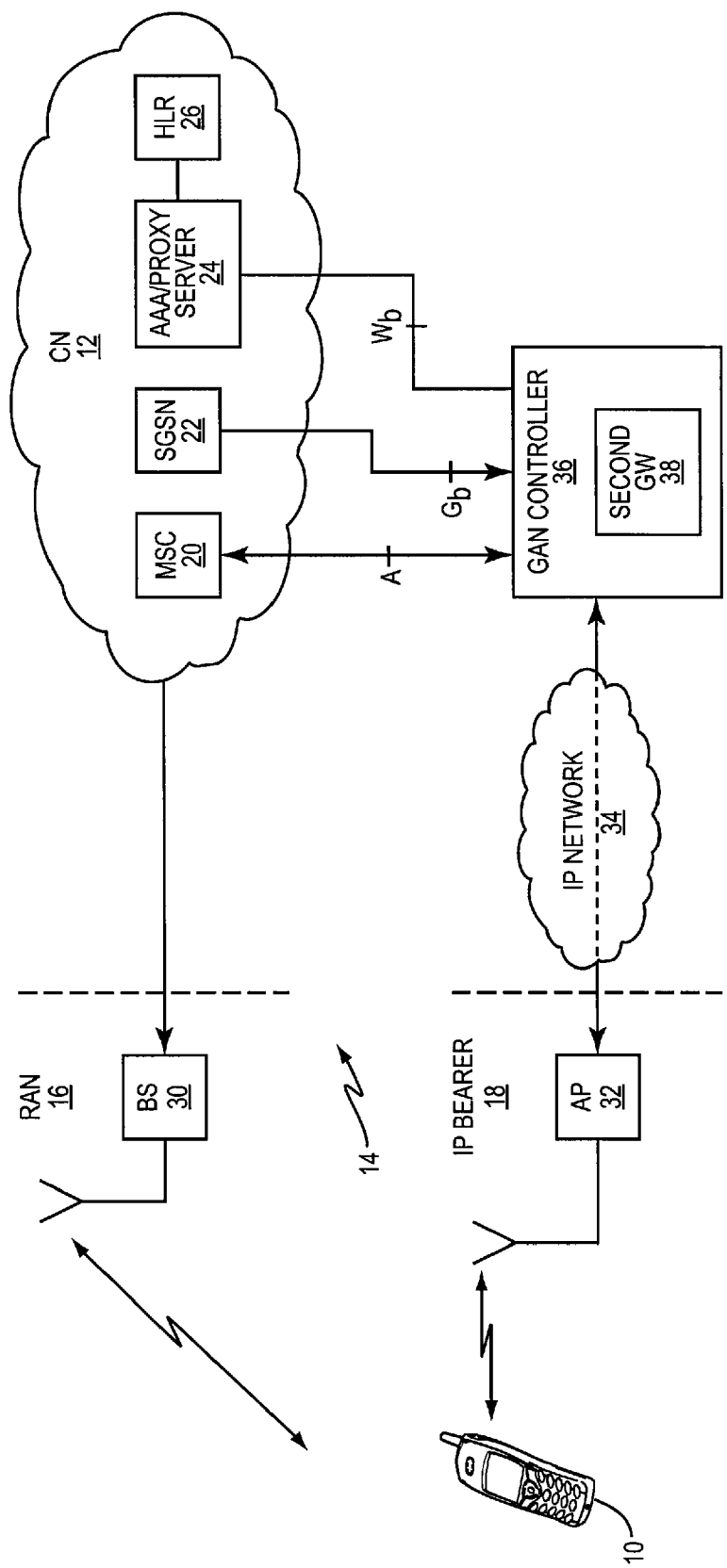
FIG. 1 is block diagram of one embodiment of a cellular communication network in an unlicensed (wireless) access network, and a wireless communication device.

FIG. 1 depicts one embodiment of a wireless communication device 10, as contemplated herein. The device 10 includes GAN functionality, meaning that it communicatively couples to a Core Network (CN) 12 of a supporting cellular communications network 14 through a cellular Radio Access Network (RAN) 16, based on the device's cellular signaling functionality, or through a given IP bearer 18, based on the device's GAN functionality. Such a bearer may be provided, for example, by a WLAN access point 32. Although the supporting cellular communications network 14 may be essentially any type of cellular network (e.g., Wideband CDMA, Long Term Evolution or LTE, etc.), it comprises a GSM/GPRS network by way of non-limiting example.

As such, the illustrated CN 12 includes a Mobile Switching Center (MSC) 20, to manage communications between devices 10 and the Public Switched Telephone Network (PSTN), which is not shown. The CN 12 further includes a Serving GPRS Support Node (SGSN) 22, which detects new GPRS-capable devices 10 within its associated service area(s), performs terminal authentication, authorization and admission control for GPRS services, sends and receives GPRS packet data to and from such devices 10, and maintains service area location information for such devices 10. The CN 12 further includes an AAA/proxy server 24 (AAA for Authentication/Access/Accounting), which provides authentication and access control for devices 10 attempting to gain connectivity with the cellular communication network 14, and provides for service accounting functions for subscriber billing, etc. The AAA/proxy server 24 therefore is associated with a Home Location Register (HLR) 26, which includes a database of subscriber information.

With the illustrated arrangement, and with GAN functionality implemented in the device 10, the device 10 communicatively couples to the CN 12 either through the cellular RAN 16, which includes one or more cellular base stations 30, or, when employing GAN access, via the IP bearer 18, such as provided by the illustrated access point 32. Those skilled in the art will appreciate that the access point 32 is, in one or more embodiments, an WiFi/WLAN access point, such as based on IEEE 802.11 standards. In any case, the access point 32 communicatively couples through a generic IP network 34, to a GAN Controller (GANC) 36, which includes a security gateway 38. In turn, the GANC 36 communicatively couples to the CN 12, and carries packet data for the device 10 into and out of the CN 12 substantially as if it were another cellular base station 12 in the cellular communication network 14.

Figure 2:
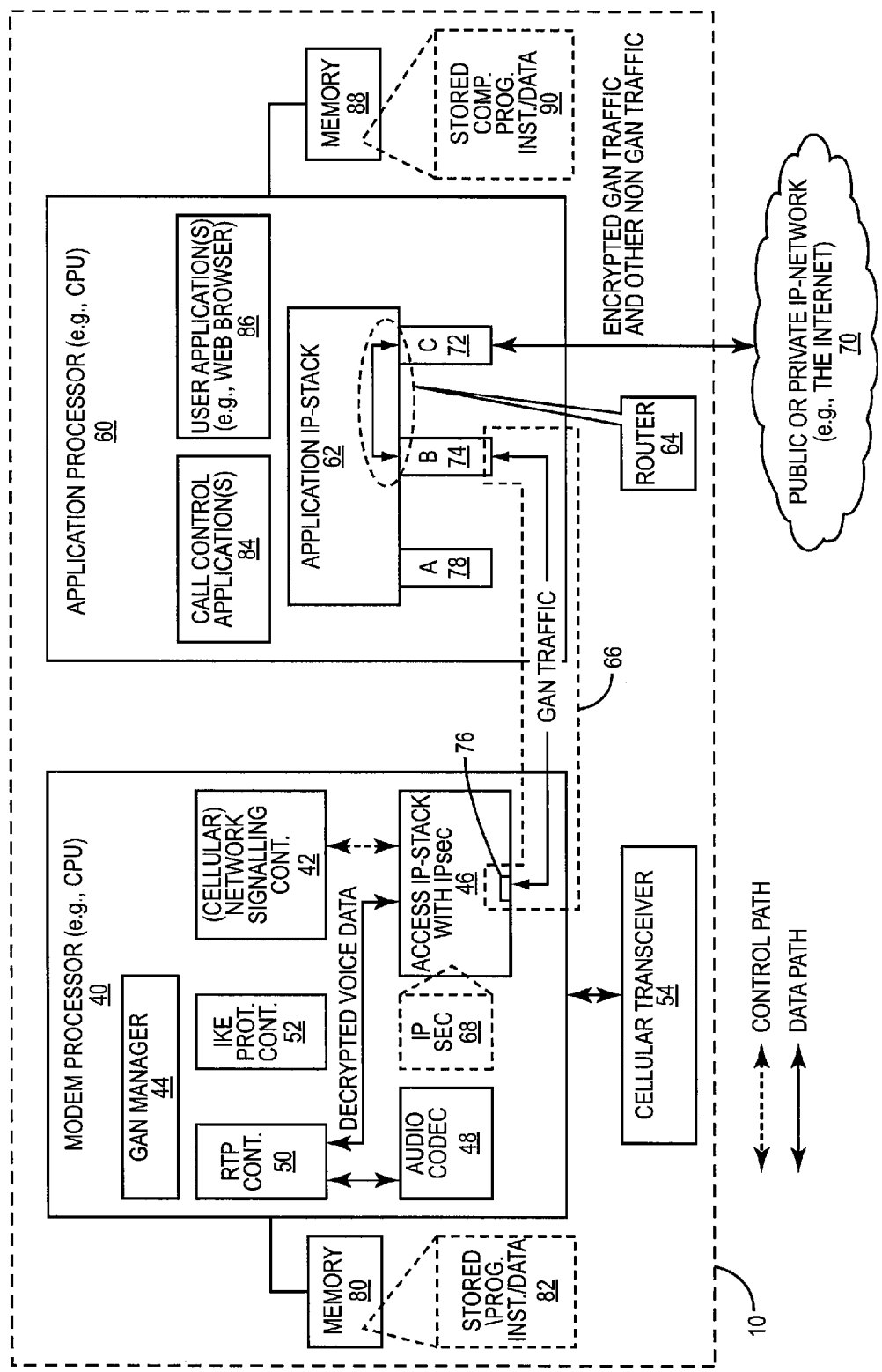
FIGS. 2 and 3 are block diagrams illustrating implementation details for an embodiment of the wireless communication device introduced in FIG. 1.

The embodiment of the device 10 illustrated in FIG. 2 implements advantageous GAN-related functionality, and comprises a modem processor 40 implementing a cellular network signaling controller 42, a Generic Access Network (GAN) manager 44, and a privately routable, first Internet Protocol (IP) stack 46 implementing IP security (IPsec). In the illustrated embodiment, the modem processor 40 further includes or implements an audio coder/decoder (codec) 48, a Real-time Transport Protocol (RTP) controller 50, and an Internet Key Exchange (IKE) Protocol controller 52. Further, the modem processor 40 includes or is associated with a cellular radio transceiver 54, which is configured to transmit cellular communication signals and to receive cellular communication signals, e.g., GSM/GPRS and/or WCDMA signals. It should be noted that audio codec 48 (audio system) is not an integral part of the GAN-related control and processing which is advantageously consolidated within the modem processor 40. Therefore, in one or more embodiments, the audio codec 48 is implemented separately from the modem processor 40, such as in an associated DSP.

The device 10 further includes an applications processor 60 implementing a publicly routable, second IP stack 62. The second IP stack 62 advantageously implements a router 64, for routing GAN traffic to and from the first IP stack 46 on a local IP link 66 bridging the first and second IP stacks 46 and 62. This configuration supports consolidation of GAN functionality within the modem processor 40, where, in one or more embodiments, an IP security (IPsec) layer 68 in the first IP stack 46 is configured to encrypt outgoing GAN traffic, and the first IP stack 46 is configured to send the outgoing encrypted GAN traffic to the second IP stack 62 over the local IP link 66. The second IP stack 62 provides NAT routing of that outgoing encrypted GAN traffic onto an external IP network 70.

Supporting that communication flow, the applications processor 60 includes or is associated with a public network interface 72, and the second IP 62 stack is configured to provide NAT routing of the outgoing encrypted GAN traffic into the public network interface 72 ("C" interface), for transport on the external IP network 70. Further, the second IP stack 62 is advantageously configured to provide NAT routing of incoming encrypted GAN traffic, as received through the public network interface 72, into a second local network interface 74 ("B" interface), for delivery to the first IP stack 46 in the modem processor 40. The first IP stack 46 in the modem processor 40 includes a complementary first local network interface 76, for establishing the local IP link 66 between, and the IP sec layer 68 of the first IP stack 46 is configured to decrypt the incoming encrypted GAN traffic for higher-layer processing by the RTP controller 50.

Correspondingly, the first IP stack 46 generates outgoing encrypted GAN traffic by encrypting outgoing RTP packets carrying outgoing Voice-over-IP (VoIP) data and generates incoming RTP packets carrying incoming VoIP data by decrypting incoming encrypted GAN traffic. Supporting this functionality, the RTP controller 50 is configured to generate the outgoing RTP packets from outgoing coded audio data and generate incoming coded audio data from the incoming RTP packets. In turn, the audio codec 48 is configured to generate the outgoing coded audio data by encoding a local input audio signal (e.g., a microphone signal), and is configured to generate a local output audio signal by decoding the incoming coded audio data (e.g., a speaker signal).

Thus, according to the above arrangement, the first local network interface circuit 76 is communicatively coupled to the first IP stack 46, and the second local network interface 74 is communicatively coupled to the second IP stack 62. This pair of interfaces 74 and 76 is configured to support the local IP link 66 between the first and second IP stacks 46 and 62, for NAT routing of encrypted GAN traffic between the first and second IP stacks 46 and 62. Further, as noted, the public network interface 72 in the applications processor 60 communicatively couples the second IP stack 62 to the external IP network 70.

Also, as noted, the second IP stack 62 is configured in one or more embodiments to perform NAT routing of incoming encrypted GAN traffic received through the public network interface 72 to the second local network interface 74, for transfer to the first IP stack 46 via the local IP link 66. Further, the second IP stack 62 performs NAT routing of outgoing encrypted GAN traffic received through the second local network interface 74, for transfer to the external IP network 70 via the public network interface 72. In another embodiment contemplated herein, encryption of outgoing GAN traffic and decryption of incoming GAN traffic is carried out via the second IP stack 62, rather than in the IPsec layer of the first IP stack 46.

With the above examples, in mind, it will be understood that in one or more embodiments of the device 10 the applications processor 60 includes or is associated with a public network interface 72 that is communicatively coupled to the second IP stack 62, for communicatively coupling the second IP stack 62 to an external IP network 70. Further, the second IP stack 62 is configured to perform NAT routing of incoming GAN traffic received through the public network interface 72 to a local network interface 74, for transfer to the first IP stack 46 via the local IP link 66, and to perform NAT routing of outgoing GAN traffic received through the local network interface 74, for transfer to the external IP network 70 via the public network interface 72. If GAN traffic encryption/decryption is done in the first IP stack 46 rather than in the second IP stack 62, then the GAN traffic passing on the local IP link 66 between the first and second IP stacks 46 and 62 is encrypted.

Figure 3:
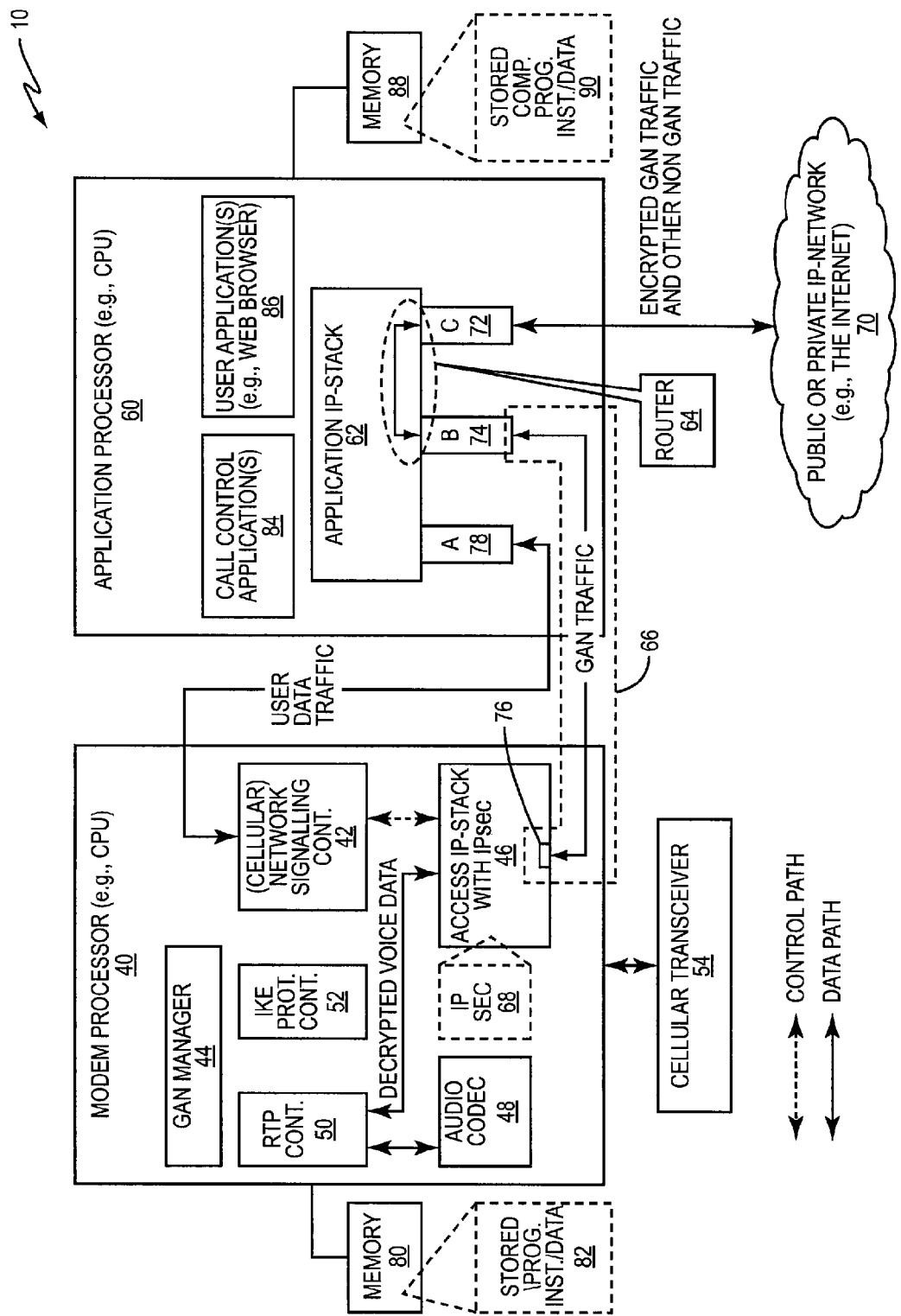

Still further, as shown in the embodiment depicted in FIG. 3, the applications processor 60 includes or is communicatively associated with an additional local network interface 78 ("A" interface) that is communicatively coupled to the cellular network signaling controller 42 of the modem processor 40, for carrying non-encrypted (non-GAN) user data traffic flowing between the modem processor 40 and the applications processor 60. Particularly, in the illustrated embodiment, the additional local network interface 78 communicatively couples the second IP stack 62 to the network signaling controller 42, for non-GAN IP traffic and control signaling transfer.

In at least one embodiment, the modem processor 40 comprises a first microprocessor-based circuit. By way of non-limiting example, the modem processor 40 comprises, e.g., a Central Processing Unit (CPU), which may be a microprocessor, microcontroller, digital signal processor (DSP), an Application Specific Integrated Circuit (ASIC) or Field Programmable Gate Array (FPGA), any of which may include a microprocessor core. Preferably, the modem processor 40 provides baseband processing of digital signal samples obtained from antenna-received radio signals, after down-conversion and digitization by the cellular transceiver 54, and similarly provides generation of baseband digital signal samples for generating radio signals transmitted by the cellular transceiver 54. Thus, the modem processor 40 may be referred to as a baseband processor or DSP.

In this context, one or more of the various controllers and other elements that are functionally illustrated as being within the modem processor 40 may be implemented in whole or in part via the execution of stored computer program instructions by the modem processor 40. As such, in at least one embodiment, one or more memory circuits or other storage devices 80 are included in or are associated with the modem processor 40. The memory circuit(s) 80 serve as a computer readable medium, and store computer program instructions and supporting data (e.g., configuration values, etc.) 82. Execution of the stored computer program instructions functionally instantiates the illustrated controllers, e.g., the GAN manager 44 and network signaling controller 42, and the first IP stack 46.

Further in this regard, it will be understood that the GAN manager 44, which may be implemented in hardware and/or software, controls or otherwise provides GAN processing functionality for the device 10. As is detailed herein, consolidating GAN processing control into the GAN manager 44 within the modem processor 40 simplifies the overall design of the device 10, and allows the same or substantially the same GAN manager 44 to be used with different application processor implementations (e.g., different operating systems, etc.)

Likewise, the applications processor 60 comprises, in one or more embodiments, a second microprocessor-based circuit. ("Second" here is a term used relative to the first microprocessor-based circuit implementing the modem processor 40, and there may be more than two microprocessor-based circuits in the device 10.) By way of non-limiting example, the applications processor 60 comprises, e.g., a Central Processing Unit (CPU), which may be a microprocessor, microcontroller, digital signal processor (DSP), an Application Specific Integrated Circuit (ASIC) or Field Programmable Gate Array (FPGA), any of which may include a microprocessor core. However, those skilled in the art will appreciate that the modem processor 40 and the applications processor 60 can be implemented on a common die (e.g., within the same integrated circuit), implemented within the same multi-chip module on the same or different die, or can be implemented as physically separate devices.

In any case, the applications processor 60 preferably is configured to host one or more call control applications 84, and one or more user applications 86 (shown in FIG. 2 and in FIG. 3). By way of non-limiting example, the applications processor 60 is configured to host an "address book" or other phone-based contacts manager that allows a user of the device 10 to place VoIP calls, using either direct cellular access via the cellular transceiver 54, or indirect GAN-based cellular access according to the above-described modem/application processor cooperation. Also, as described for the non-GAN user data traffic illustrated in FIG. 3, the one or more user applications comprise, for example, an email application and a web browser client, which are configured to communicate with Internet-based servers using protocols such as HTTP and SMTP. These "pure" Internet communications do not, as a general proposition, need GAN-based cellular connectivity.

The functionality encompassed by the applications processor 60 is, in one or more embodiments, implemented in part or in whole based on the applications processor 60 executing stored computer program instructions. As such, one or more memory circuits or other storage devices 88 operate as a computer readable medium, for storing computer program instructions and associated supporting data 90. It will be understood that these stored computer program instructions may be organized as a collection of programs and/or program functions.

In at least one such embodiment, the applications processor 60 is configured to execute (additional) stored program instructions defining a desired operating system (OS), for implementing the second IP stack and hosting one or more user applications, as desired. As non-limiting examples, the applications processor 60 implements a Linux operating system, a SYMBIAN operating system, or a WINDOWS MOBILE operating system. In such embodiments, the second IP stack 62 advantageously may comprise the pre-packaged IP stack provided as part of the OS, but particularly configured for the NAT routing described herein.

Further, the GAN manager 44 of the modem processor 40 is, in at least one such embodiment, configured to establish IP and IPsec connections toward the supporting cellular communication network 14 (see FIG. 1), as needed. The GAN manager 44 is further configured to export an Application Program Interface (API) towards the call control application(s) 84 as hosted by the OS implemented by the applications processor 60. The API allows the call control application(s) 84 to initiate or otherwise carry out GAN-based calls, while still allowing the GAN functionality to be contained within the modem processor 40.

Of course, those skilled in the art will appreciate that the modem and applications processors 40 and 60 can be implemented in a variety of ways, including at least partially implementing them in signal processing hardware, e.g., as programmed logic gates in an FPGA or other programmable logic circuit. However implemented, the mode processor 40 and the applications processor 60 are configured to implement a method of supporting GAN functionality in the device 10.

Figure 4:
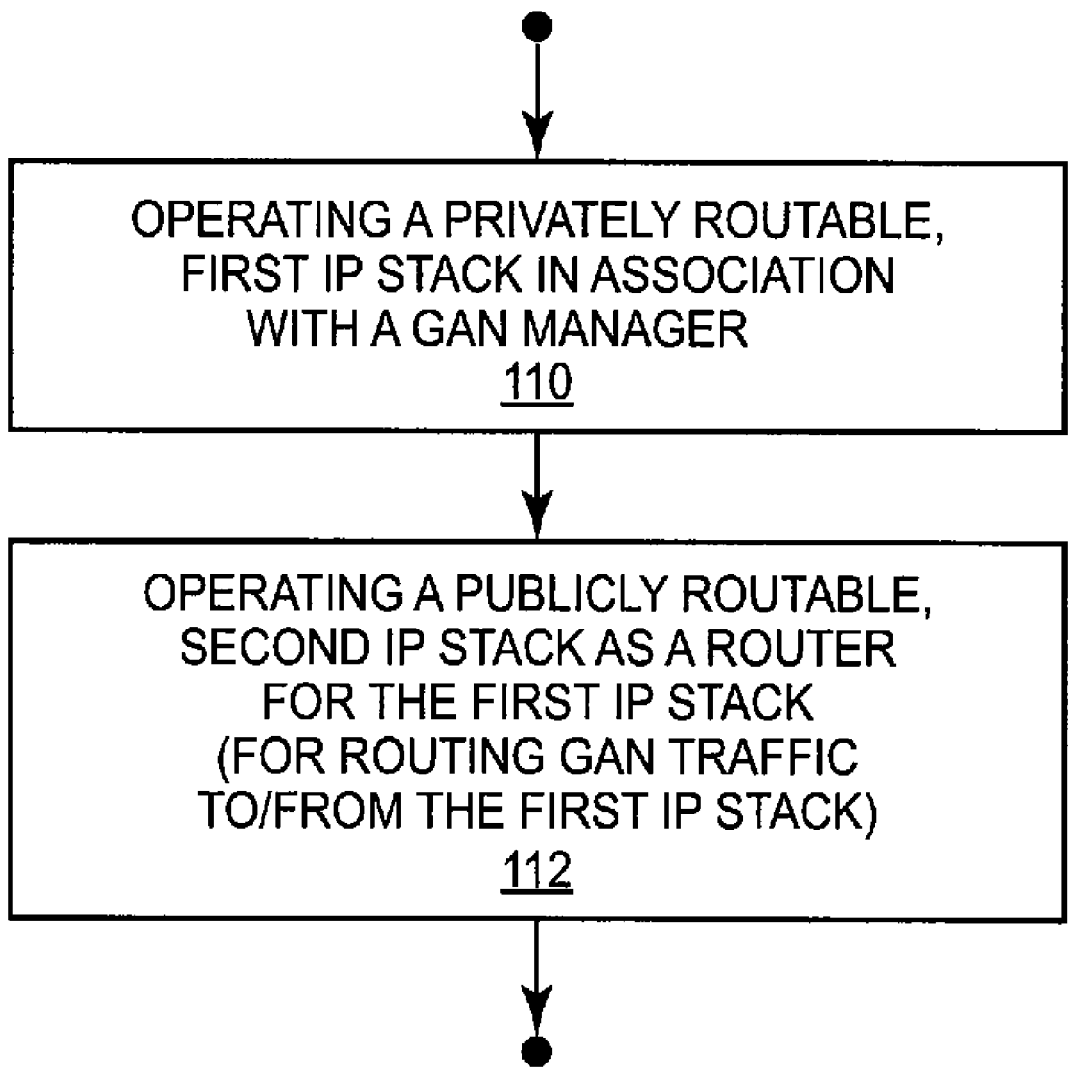
FIG. 4 is a logic flow diagram illustrating one embodiment of a method of Generic Access Network (GAN) functionality implemented by the wireless communication device of FIG. 2 or 3, for example.

FIG. 4 illustrates one embodiment of the method, wherein processing includes operating a privately routable, first IP stack 46 with IP security (IPsec) processing in association with a GAN manager 44 (Block 110). The first IP 46 stack is configured for encrypting outgoing GAN traffic and decrypting incoming GAN traffic, e.g., using an IPsec layer 68.

The method further includes operating a publicly routable, second IP stack 62 as a Network Address Translation (NAT) router 64 for the first IP stack 46 (Block 112). So configured, the second IP stack 62 routes outgoing encrypted GAN traffic from the first IP stack 46 to a public network interface 72. The second IP stack 62 further routes incoming encrypted GAN traffic from the public network interface 72 to the first IP stack 46, where the first and second IP stacks 46 and 62 are bridged via a local IP link 66.

As shown in either of FIG. 2 or 3, at least one embodiment of the method includes implementing the GAN manager 44 and the first IP stack 62 in the modem processor 40 of the device 10, where the modem processor 40 is configured to provide cellular network signaling. "Implementing" in this sense may be regarded as a matter of design implementation, but also may be regarded as an active step, wherein execution of stored computer program instructions by the modem processor implements the GAN manager 44, etc. Similarly, the method further includes implementing the second IP stack 62 via the applications processor 60 of the device 10, which is also configured to host one or more call control and user applications 84 and 86.

According to at least one method embodiment, outgoing encrypted GAN traffic is generated in the first IP stack based on receiving encoded audio data carried in an outgoing RTP packet stream provided by RTP controller 50, which is implemented in the modem processor 40. The method further includes generating an incoming RTP packet stream carrying encoded audio data, for the RTP controller 50, based on decrypting the incoming encrypted GAN traffic. Again, the IPsec layer 68 in the first IP stack 46 is configured to provide GAN-related encryption/decryption processing, and the IKE controller 52 is configured to provide authentication key processing in support of obtaining GAN-based connectivity with the supporting cellular communication network 14 (as shown in FIG. 1).

With the above example details in mind, those skilled in the art will appreciate the advantageous reduction in complexity and the advantageous gains in GAN-related security provided by the present invention. In particular, these gains are realized in comparison to "conventional" GAN implementation in so-called smart phones and other wireless terminals. In such conventional devices, IP-based communications, including GAN functions, are supported on a single IP stack. That IP stack and the logic controlling IP connections execute on an application CPU, while the required cellular network signaling functions execute on a modem CPU, and extensive, complex proxy-based interfaces are required between the two CPUs to implement GAN functionality.

Further, such conventional deployments intimately tie GAN functionality to the application CPU hardware and associated OS, meaning that GAN-related code needs to be ported or re-written for different application CPU implementations. Still further, such conventional deployments force GAN traffic to pass unprotected between the application CPU and the modem CPU, leaving such traffic, including sensitive access control signaling, vulnerable to tampering or interception.

In contrast, the apparatus and method taught by the present invention segregate the GAN-related functionality to the modem processor 40, which in one or more embodiments provides a secure, dedicated processing environment that advantageously localizes GAN encryption/decryption and control with cellular network signaling. A local IP link bridges the GAN-associated IP stack with an IP stack in the applications processor that is configured to provide NAT routing of GAN-related traffic incoming to and outgoing from the device 10.

That is, the application processor's IP stack provides a publicly routable IP address, but does not perform GAN encryption/decryption, and instead routes encrypted GAN traffic to/from the privately routable IP address of the modem processor's IP stack. The application processor's IP stack therefore must be able to do NAT routing and a DNS proxy service, but it does not expose unencrypted GAN data on the interface between the modem and application processors 40 and 60.

Instead, the GAN traffic from the device 10 to the external IP network 70 is encrypted by the IPsec layer 68 in the modem processor's IP stack 46 and sent to the local interface 74 of the application processor's IP stack 62. Such traffic is sent over the local IP link 66 between the two stacks 46 and 62. Correspondingly, the application processor's IP stack 62 acts as a NAT router for the GAN traffic arriving on the local network interface 74, and forwards it to the public network interface 72. Conversely, GAN traffic arriving from the network 70 on the public interface 72 is forwarded to the local network interface 74, for further transport to the modem processor's IP stack 46, which decrypts the packets for further processing by higher layers.

As such, all needed GAN-specific "building blocks" used to implement the device 10 can be shared as a matter of design between any number of devices that use the same or similar modem processors 40, essentially irrespective of the application processor details (including OS choice). Such commonality speeds the deployment of new and revised device models, and can simplify cellular testing and type approvals.

Of course, those skilled in the art will recognize additional features and advantages, and will recognize that the foregoing discussion and accompanying illustrations as non-limiting. Indeed, the present invention is limited only by the following claims and their legal equivalents.

What is claimed is:

1. A wireless communication device comprising:
  a modem processor implementing a cellular network signaling controller, a Generic Access Network (GAN) manager, and a privately routable, first Internet Protocol (IP) stack; and
  an applications processor implementing a publicly routable, second IP stack, said second IP stack implementing a router for routing GAN traffic to and from the first IP stack on a local IP link bridging the first and second IP stacks;
  wherein the router implemented by the second IP stack is a Network Address Translation (NAT) router; and wherein an IP security (IPsec) layer in the first IP stack is configured to encrypt outgoing GAN traffic and the first IP stack is configured to send the outgoing encrypted GAN traffic to the second IP stack over the local IP link, for NAT routing onto an external IP network by the second IP stack.

2. The wireless communication device of claim 1, wherein the applications processor includes or is associated with a public network interface, and wherein the second IP stack is configured to provide NAT routing of the outgoing encrypted GAN traffic into the public network interface for transport on an external IP network.

3. The wireless communication device of claim 2, wherein the second IP stack is configured to provide NAT routing of incoming encrypted GAN traffic, as received through the public network interface, into a local network interface establishing the local IP link with the first IP stack, for delivery to the first IP stack in the modem processor, and wherein the IP sec layer of the first IP stack is configured to decrypt the incoming encrypted GAN traffic for higher-layer processing by a Real-time Transport Protocol (RTP) controller implemented within the modem processor.

4. The wireless communication device of claim 1, wherein the first IP stack generates outgoing GAN traffic from outgoing Real-time Transport Protocol (RTP) packets carrying outgoing Voice-over-IP (VoIP) data and generates incoming RTP packets carrying incoming VoIP data from incoming GAN traffic, and wherein the modem processor includes an RTP controller for generating the outgoing RTP packets from outgoing coded audio data and generating incoming coded audio data from the incoming RTP packets.

5. The wireless communication device of claim 4, wherein the modem processor includes or is associated with an audio codec that is configured to generate the outgoing coded audio data by encoding a local input audio signal, and is configured to generate a local output audio signal by decoding the incoming coded audio data.

6. The wireless communication device of claim 1, wherein the modem processor includes or is associated with a first local network interface circuit that is communicatively coupled to the first IP stack, the applications processor includes or is associated with a second local network interface that is communicatively coupled to the second IP stack, and wherein the first and second local network interfaces are configured to support the local IP link between the first and second IP stacks, for routing of GAN traffic between the first and second IP stacks.

7. The wireless communication device of claim 6, wherein the applications processor includes or is associated with a public network interface that is communicatively coupled to the second IP stack, for communicatively coupling the second IP stack to an external IP network, and wherein the second IP stack is configured to perform Network Address Translation (NAT) routing of incoming encrypted GAN traffic received through the public network interface to the second local network interface, for transfer to the first IP stack via the local IP link, and to perform NAT routing of outgoing encrypted GAN traffic received through the second local network interface, for transfer to the external IP network via the public network interface.

8. The wireless communication device of claim 6, wherein the applications processor further includes or is communicatively associated with an additional local network interface communicatively coupled to the cellular network signaling controller of the modem processor, for carrying non-encrypted user data traffic flowing between the modem processor and the applications processor.

9. The wireless communication device of claim 1, wherein the modem processor comprises a first microprocessor-based circuit and the applications processor comprises a second microprocessor-based circuit, and wherein the first IP stack is implemented at least in part based on execution of stored computer program instructions held in a memory circuit included in or accessible by the modem processor, and wherein the second IP stack is implemented at least in part based on execution of stored computer program instructions held in a memory circuit included in or accessible by the applications processor.

10. The wireless communication device of claim 9, wherein the applications processor is configured to execute additional stored program instructions defining a desired operating system, for implementing the second IP stack and hosting one or more user applications, as desired.

11. The wireless communication device of claim 10, wherein the GAN manager of the modem processor is configured to establish IP and IP security (IPsec) connections toward a supporting cellular communication network, as needed, and to export an Application Program Interface (API) towards a call control application hosted by the desired operating system implemented by the applications processor.

12. A method of supporting Generic Access Network (GAN) functionality in a wireless communication device, said method comprising:
operating a privately routable, first IP stack in association with a GAN manager, wherein operating the first IP stack includes encrypting outgoing GAN traffic and decrypting incoming encrypted GAN traffic via IP security (IPsec) processing in the first IP stack; and
operating a publicly routable, second IP stack as a router for the first IP stack, to route outgoing GAN traffic from the first IP stack to a public network interface and to route incoming GAN traffic from the public network interface to the first IP stack, said first and second IP stacks being bridged via a local IP link;
wherein operating the second IP stack as a router for the first IP stack includes:
performing Network Address Translation (NAT) routing of incoming encrypted GAN traffic received through the public network interface, for transfer to the first IP stack via the local IP link; and
performing NAT routing of outgoing encrypted GAN traffic received from the first IP stack through the local IP link, for transfer to the external IP network via the public network interface.

13. The method of claim 12, further comprising implementing the GAN manager and the first IP stack in a modem processor of the wireless communication device that is configured to provide cellular network signaling, and implementing the second IP stack via an applications processor of the wireless communication device that is configured to host one or more call control and user applications.

14. The method of claim 13, further comprising generating the outgoing GAN traffic in the first IP stack based on receiving encoded audio data carried in an outgoing Real-time Translation Protocol (RTP) packet stream provided by an RTP controller implemented in the modem processor, and generating an incoming RTP packet stream carrying encoded audio data, for the RTP controller, based on processing the incoming GAN traffic.

15. The method of claim 12, further comprising implementing the first IP stack in a modem processor comprising a first microprocessor-based circuit and implementing the second IP stack in an applications processor comprising a second microprocessor-based circuit, and wherein the first IP stack is implemented at least in part based on execution of stored computer program instructions held in a memory circuit included in or accessible by the modem processor, and wherein the second IP stack is implemented at least in part based on execution of stored computer program instructions held in a memory circuit included in or accessible by the applications processor.

16. The method of claim 15, further comprising implementing a desired operating system for the wireless communication device via the applications processor, for hosting one or more call control and user applications, as desired.

17. The method of claim 15, further comprising configuring a cellular network signaling controller in the modem processor to establish IP and IP security (IPsec) connections toward a supporting cellular communication network, as needed, and to export an Application Program Interface (API) towards a call control application hosted by the applications processor.

* * * * *